May 3, 1932. C. D. SMITH 1,856,516
GAS REVERSING VALVE
Filed May 23, 1930 3 Sheets-Sheet 1
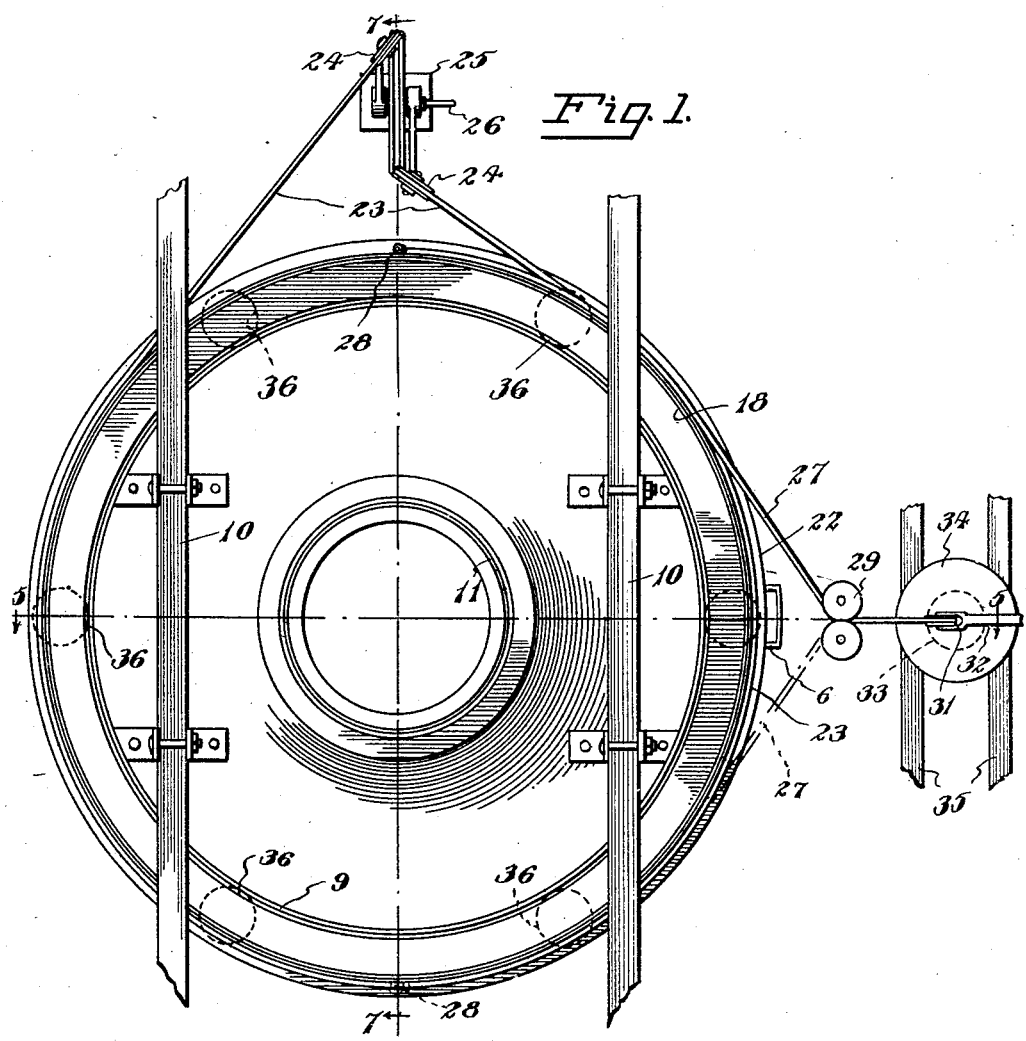
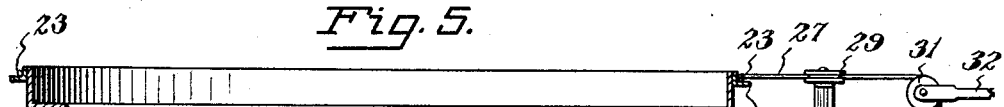
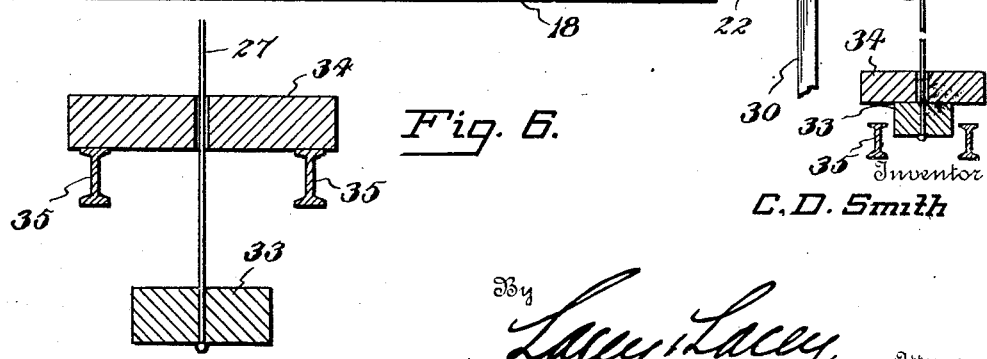
Inventor
C. D. Smith
By Lacey & Lacey, Attorneys

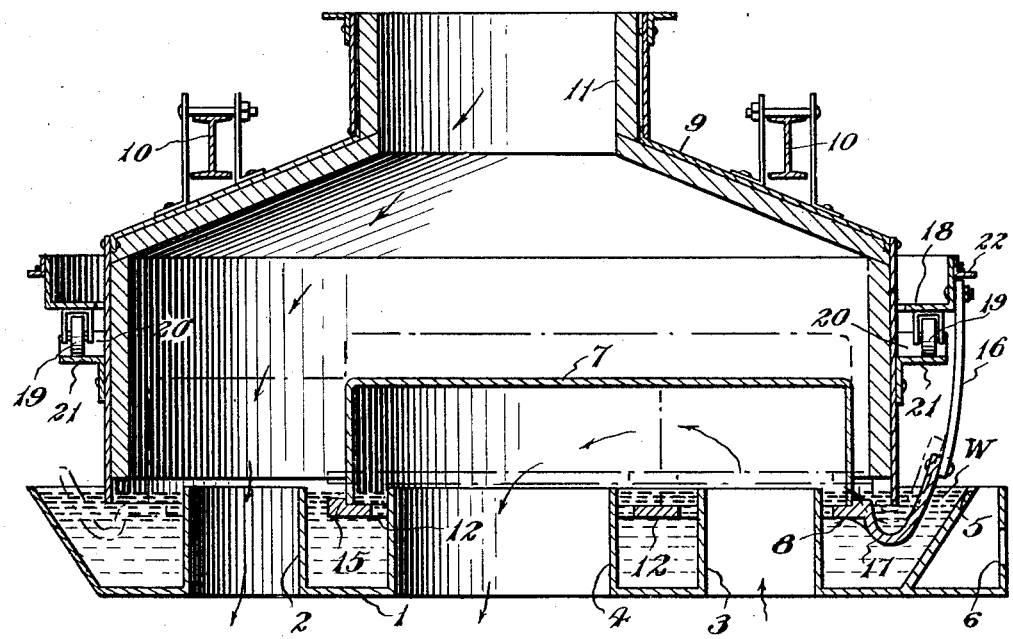
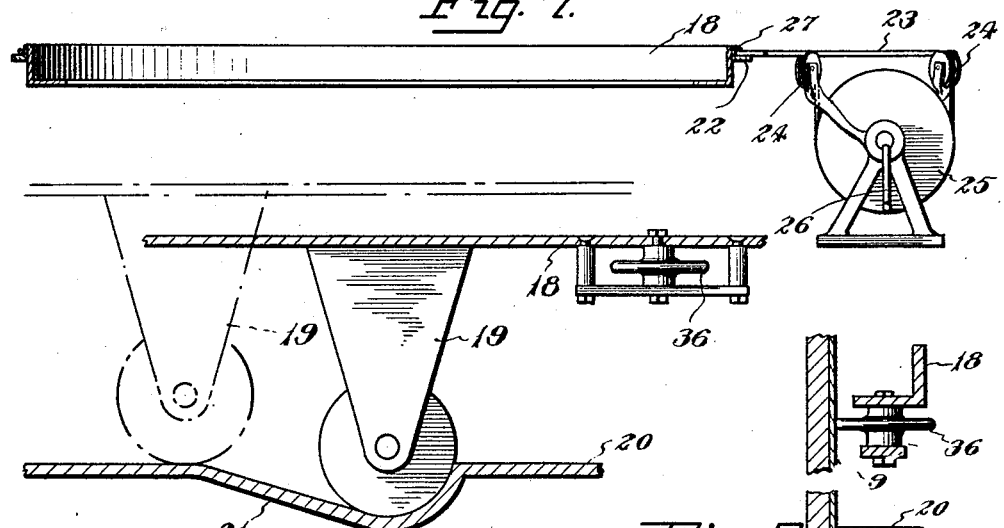

Patented May 3, 1932

1,856,516

UNITED STATES PATENT OFFICE

CARL D. SMITH, OF WASHINGTON, PENNSYLVANIA

GAS REVERSING VALVE

Application filed May 23, 1930. Serial No. 455,047.

This invention relates to producer gas reversing valves for regenerative furnaces.

Producer gas reversing valves have hitherto been difficult to clean and care for. The usual practice is to shut off the gas once a week, open up the valve and clean out all deposits of soot, dirt and tar from the inside. The supports for the valve are usually disposed inside the sealing pan and under the water and these frequently become fouled by accumulations of tar and soot which can not be readily cleaned out unless the valve is opened up so that the workman may have access to the bearings and this, of course, means interruption in the operation of the furnace.

The present invention has for an object, therefore, to dispose all operating mechanism and supports for the turtle valve on the exterior of the apparatus where they cannot become fouled by tar and soot, thus leaving the bottom of the sealing pan free of all supporting obstacles. Cleaning tools can readily reach all parts of the pan. A further advantage is that this cleaning process may be carried out at any time without shutting off the gas and without interfering in any manner with the normal operation of the furnace.

Reversing valves of the ordinary type require considerable manual labor to reverse the valve. Frequently it takes the combined efforts of two laborers to reverse, particularly when the reversing mechanism becomes fouled with tar and soot.

A further object of the present invention, therefore, is to provide reversing mechanism by means of which the valves may be reversed, even when fouled, with minimum manual effort.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a plan view of my improved gas reversing valve,

Fig. 2 is a longitudinal sectional view through the gas reversing valve,

Figure 3:
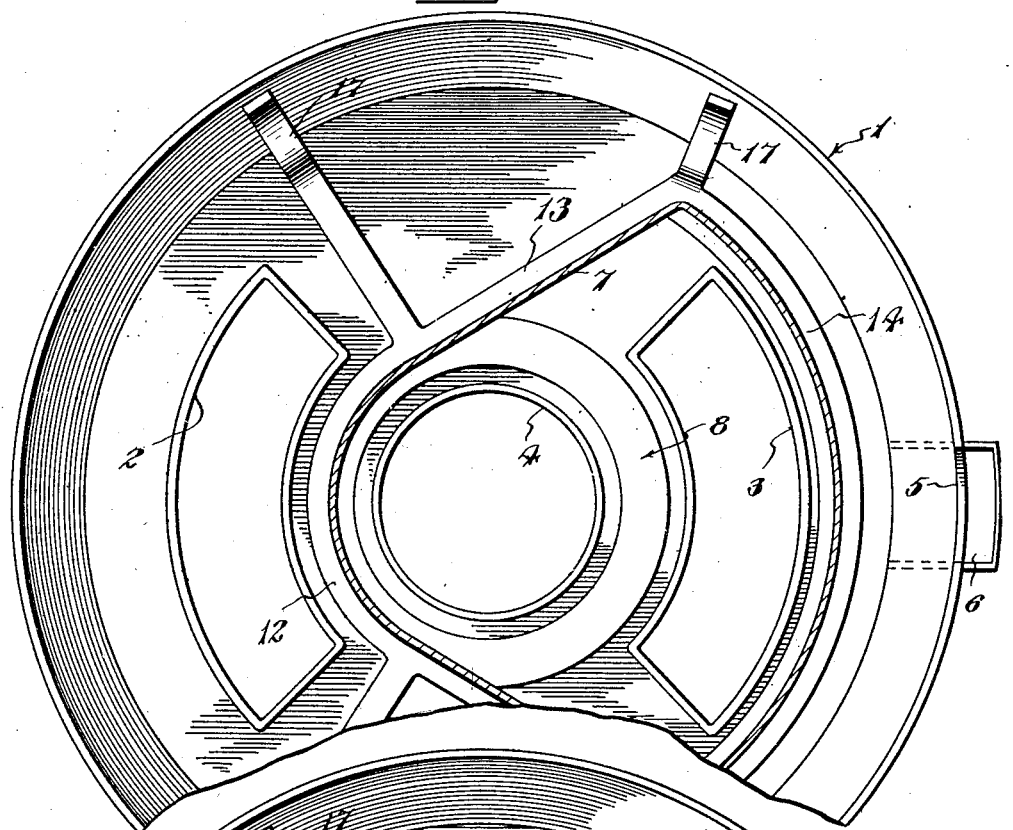
Figure 4:
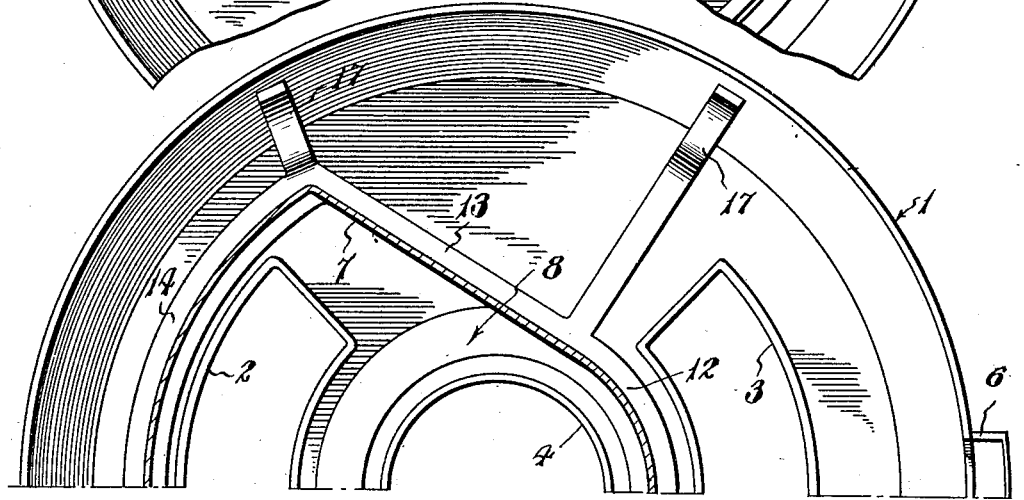

Fig. 3 is a plan view of the sealing pan with the turtle valve shown in section and the spider in elevation, Fig. 4 is a view similar to Fig. 3 with the turtle shown reversed, Fig. 5 is a cross sectional view on the line 5—5 of Fig. 1, Fig. 6 is a detail sectional view showing the weights of the reversing mechanism in a different position than shown in Fig. 5, Fig. 7 is a cross sectional view on the line 7—7 of Fig. 1, Fig. 8 is a detail sectional view showing the track and trucks for supporting the turtle valve. and Fig. 9 is a detail sectional view of the thrust bearings.

Ordinarily, producer gas as a fuel for a regenerative furnace, and air for the combustion thereof, pass through reversing valves into separate flues which lead to checker chambers. Here, both air and gas rise through highly heated checker brick to the furnace ports where they mix and burn with a high temperature as they pass through the furnace. The burnt gases leave on the opposite side of the furnace through ports of similar construction to those through which they enter, and then pass downward through checker brick which absorbs heat from the hot gases. These burnt gases then follow flues to the reversing valves through which they pass on the way to the stack and without coming in contact with the fresh supply of incoming gas and air.

The fact that both the air and gas become highly heated in the checkers before they mix and burn in the furnace adds much to the temperatures attainable. It is easily seen that should the direction of flow be maintained for a considerable period of time, the checkers on the inlet side would gradually cool off, resulting in much lower furnace temperature while the checkers on the outlet side would build up heat. Accordingly, it is desirable to periodically change the direction of flow through the furnace and checkers, so that much higher furnace temperatures can be maintained, and for this purpose I have provided the reversing valve which will now be described.

Referring now to the drawings, the reversing valve is shown to comprise a circular base or sealing pan 1, preferably formed of cast iron, in which there are formed openings or ports 2, 3 and 4. These ports are of the general shape shown in Fig. 3, the ports 2 and 3 being arcuate, and the port 4 being circular, the walls of all of the ports preferably rising to the top of the sealing pan, as shown best in Fig. 2, the ports 2 and 3 connect with the flues which lead to the checkers on opposite sides of the furnace and the port 4 connects with a flue which leads to the stack, these parts being of the usual and well known construction and hence not being illustrated. The sealing pan is filled with water, to the level indicated at W, and has an overflow 5 which is provided with a drain 6.

The turtle valve 7 is a box preferably formed of sheet metal, and provided with a closed top and sides and having an open bottom. The turtle valve is of such size as to simultaneously establish communication between the center port 4 and one of the side ports 2 or 3, as best shown in Figs. 3 and 4. The valve, as shown, is preferably formed substantially triangular in horizontal cross section and is provided with curved portions in the side walls to conform to the curvature of the arcuate ports and the circular center port. The turtle valve is supported upon a suspended spider 8, hereinafter described, and is disposed with a lower edge below the surface of the water, whereby an effective water seal is produced to prevent escape of gases past the valve.

The valve housing 9, which preferably is brick lined, is substantially of the shape shown in Fig. 2 and is suspended from I-beams 10 which may be secured to any suitable support. The housing is provided in the dome thereof with a port 11 for the admission of producer gas which, when the ports are in the position shown in Fig. 2, follows the path indicated by the arrow-heads to the port 2 in the sealing pan and up through the checkers to the furnace where it burns. The burnt gases leaving the furnace follow the path indicated by the arrow-heads through the port 3, turtle valve 7 and port 4 to the stack. The metal cylindrical side wall of the housing extends below the fire brick lining and dips beneath the surface of the water in the sealing pan, thus making a gas-tight closure.

The above mentioned spider 8 which supports the turtle valve preferably is formed with a central ring 12 having arms 13 extending therefrom at a tangent to support the side walls of the turtle valve 7, the arms being connected terminally by the arcuate arm 14 for the same purpose. The ring and arms 13 and 14 are recessed to provide a seat 15, as shown in Fig. 2, to receive the bottom edge of the turtle valve 7. A plurality of substantially vertically disposed arms 16 are secured to the spider. These arms are preferably four in number and the spider is provided with a like number of curved arms 17 which pass under the submerged lower edge of the housing 9 and are bolted, riveted, or otherwise rigidly secured to the arm 16. The unitary integral structure comprising the ring 12, arms 13, 14, 16 and 17 constitutes the spider as a whole and hereinafter this structure will be referred to as the spider.

The spider is suspended from the housing 9 and for this purpose a circular angle iron 18 is preferably riveted to the upper ends of the arm 16 of the spider. A plurality of trucks 19 are secured to the bottom face of the angle iron. These trucks ride on a circular track 20 formed of angle iron and preferably riveted to the exterior of the housing. Thus, the spider 8 and the turtle valve 7 are suspended from the housing and can be revolved as a unit about the central vertical axis of the housing to permit of the turtle valve being reversed from the position shown in Fig. 3 to that shown in Fig. 4 whereby to effect a reversal of the direction of flow of the furnace gases.

When the turtle valve is in the position shown in Fig. 2 or in the reversed position shown in Fig. 4, the lower edge of the valve, and also the spider 8 upon which the valve rests, are below the surface of the water in the sealing pan and are therefore below the tops of the ports 2, 3 and 4. It is apparent then that before a reversal can take place, the spider and also the turtle valve must be raised in order that the framework of the spider may pass above and over the ports as the turtle valve is moved from the position shown in Fig. 3 to that shown in Fig. 4 and vice versa. This is accomplished as follows. When the turtle valve is in either of its operative positions the trucks 19 rest in depressions 21 formed in the track 20, as best shown in Fig. 8. When a reversal is made the trucks roll up and out of the depressions 21 and onto the track 20 at which elevation there is ample clearance for the spider to pass over the ports 2, 3 and 4.

The turtle valve and the spider naturally have considerable weight, and, therefore, considerable pull is necessary when starting to reverse in order to pull the trucks 19 up and out of the depressions or seats 21. This operation is made easy by a counter-balance, best shown in Figs. 1, 5 and 6, and which will now be described.

A circular angle iron 22 is riveted or otherwise rigidly secured to the circular angle 18 and forms a guide for operating cable 23 which encircles the circular angle iron 18, as shown in Fig. 1. The ends of the operating cable pass over sheaves 24 and are attached to a cable drum 25, as best shown in Fig. 7, which is manually operated by a crank 26. By turning the crank first in one direction and then the other, the turtle valve is readily changed from one position to the other as will be understood.

A counter-balance cable 27 is also terminally secured to the circular angle iron 18, as shown at 28, and passes along the guide angle 22 and between spaced sheaves 29 disposed horizontally on a vertical support 30. From thence the counter-balance cable passes over a vertically disposed sheave 31 carried by a hanger 32 and is terminally fixed to a light counter-weight 33. The light counter-weight in turn carries a heavier counter-weight 34 over only such part of its travel as is necessary to balance the weight of the spider and turtle valve during the rise and fall thereof while the trucks 19 are entering or leaving the seats 21.

Thus, while the trucks 19 are passing from the position shown in full lines in Fig. 8 to the position shown in dotted lines in Fig. 8, the heavy counter-weight 34 descends and just comes to rest on stationary supports 35, as best shown in Fig. 6, as the trucks arrive at the position shown in dotted lines in Fig. 8 where the heavy counter-weight 34 is no longer needed. The lighter counter-weight 33 continues to gravitate until the fixed terminal 28 of the counter-balance cable 27 passes the center between the sheaves 29 when it again raises and lifts the heavier counter-weight 34 just as the trucks 19 start to enter the seats 21 at the end of a reverse.

In the operation when the turtle valve is in the position shown in Figs. 2 and 3 producer gas follows the path indicated by the arrow-heads through the ports 11 in the housing and 2 in the sealing pan to the checkers and from thence to the furnace where it burns. The burnt gases leaving the furnace follow the path indicated by the arrow-head through the port 3 of the sealing pan through the turtle valve 7 and through the port 4 of the sealing pan to the stack. After a reverse, that is when the turtle valve is in the position shown in Fig. 4, the producer gas passes through the port 3 to the checkers and the burnt gases pass from the furnace through the ports 2 and 4 on their way to the stack.

It will be observed from the above description that all of the operating mechanism and supports for the turtle valve are on the exterior of the apparatus where they cannot become fouled by tar and soot, thus leaving the bottom of the sealing pan free from all supporting obstructions. Consequently, cleaning tools or even a steam jet or suction hose may be used to easily reach all parts of the pan, to effect the removal of accumulated tar, soot and dirt therefrom without shutting off the gas or interfering in any manner with the normal operation of the furnace.

It will be further pointed out that by virtue of the novel counter-balance weights for assisting in making a reverse, the manual labor incident thereto is substantially decreased so that minimum effort will accomplish the same result hitherto requiring the combined efforts of several laborers.

It will be apparent that due to the tension in the operating cable 23, as well as in the counter-balance cable 27, there is a tendency for horizontal thrust of the angle iron 18 relatively to the housing 9 and the angle iron 22. In order to take care of this, thrust bearings 36 are secured to the angle iron 18, as best shown in Fig. 9, and bear against the housing, as shown best in Fig. 1.

Having thus described the invention, I claim:

1. A reversing valve for regenerative furnaces comprising a base sealing pan adapted to contain a sealing fluid, said pan having a centrally disposed stack port and diametrically opposite gas ports, a stationary housing adapted to enter said pan and extend into said sealing fluid, said housing having a gas port, a turtle valve adapted to enter said pan and extend into said sealing fluid, means rotatably suspending the valve at the bottom edge from the exterior of the wall of the housing, and means disposed exteriorly of the housing and the pan for rotating said valve to selectively connect either of said gas ports with said stack port.

2. A reversing valve for regenerative furnaces comprising a base sealing pan having diametrically opposite gas ports and a central stack port between the gas ports, a stationary housing extending into said pan below the level of said sealing medium and having a gas port, a spider rotatably mounted on the exterior of said housing and extending into said sealing pan, a turtle valve carried by said spider and adapted to selectively connect either of said gas ports with said stack port, and means disposed exteriorly of said housing and said pan for rotating said spider.

3. A reversing valve for regenerative furnaces comprising a base sealing pan adapted to contain a sealing fluid and having a centrally disposed stack port and gas ports on opposite sides of the stack port, a stationary housing extending into said pan below the sealing medium level thereof, a spider disposed in said pan below said sealing medium level and having arms projecting underneath said housing and extending upwardly along the exterior thereof, a circular angle iron surrounding said housing and connecting said arms, trucks carried by said angle iron, a track fixed to the housing and supporting said trucks, an operating cable disposed on said angle iron for rotating the spider, and a turtle valve carried by said spider within said pan and extending below the level of said sealing medium, said valve being adapted to connect either of said gas ports with said stack port.

4. A reversing valve for regenerative furnaces comprising a base sealing pan having a centrally disposed stack port and gas ports on opposite sides thereof, a stationary housing extending into said sealing pan, a spider disposed within said sealing pan and rotatable about the vertical central axis of said housing, a turtle valve carried by said spider and extending into said pan and adapted to selectively connect either of said gas ports with said stack port, said pan being adapted to contain a sealing medium, means disposed exteriorly of the housing for rotating said spider, and counter-balance means disposed exteriorly of the housing for assisting in the rotation of said spider and turtle valve.

5. A reversing valve for regenerative furnaces comprising a base sealing pan adapted to contain a sealing fluid, and having a stack port and a pair of gas ports, a stationary housing projecting into said pan below the sealing fluid level, a spider disposed in said pan, a turtle valve carried by said spider adapted to selectively connect either of said gas ports with said stack port, said ports extending above the level of said sealing medium, a track on the exterior of said housing, trucks carried by said spider and riding on said track, there being depressions in said track, means for lifting said trucks out of said depressions whereby to raise said spider and said valve to clear said pan to permit a rotation of said valve, and a cable and cable drum operatively connected to said spider for rotating the spider and turtle valve as a unit.

6. A reversing valve for regenerative furnaces comprising a base sealing pan adapted to contain a sealing fluid and having a stack port and spaced gas ports, a stationary housing projecting into said pan below the sealing fluid level, a spider rotatably mounted upon the exterior of said housing and normally disposed within said pan below the sealing fluid level, means for mounting said spider for vertical movement relative to said pan whereby the spider may clear said pan to permit rotation of the spider, a valve carried by the spider adapted to selectively connect said stack port with either of said gas ports, means for rotating said spider disposed exteriorly of said housing, counter-balance means for moving said spider vertically, and stops operatively connected to said spider and said housing for limiting rotary movement of said spider.

7. A reversing valve for regenerative furnaces comprising a base sealing pan adapted to contain a sealing fluid and having a stack port and a pair of gas ports, a stationary housing projecting into said pan below the sealing fluid level, a spider disposed in said pan, a turtle valve carried by said spider adapted to selectively connect either of said gas ports with said stack port, said ports extending above the level of said sealing medium, a track on said housing having depressions therein, trucks carried by said spider and riding on said track and adapted to seat in said depressions to dispose said valve in operative position, a cable and cable drum operatively connected to said spider for rotating the spider and turtle valve as a unit, a counter-balance weight on said cable, a counter-balance weight on said cable above the first named counter-balance weight for assisting in raising said trucks out of said depressions whereby said valve may clear said pan to permit rotation of said valve, and means for supporting the last named counter-balance weight when said trucks have moved out of or into said depressions.

8. A reversing valve for regenerative furnaces comprising a base sealing pan adapted to contain a sealing fluid, and having a central stack port and gas ports on opposite sides of the stack port, a stationary housing projecting into said pan below the sealing fluid level, a spider normally disposed in said pan, a turtle valve carried by said spider and normally extending below the sealing fluid level of said pan, said valve being adapted to selectively connect either of said gas ports with said stack ports, a track on the exterior of said housing, trucks carried by said spider and riding on said track, a cable and drum operatively connected to said spider for rotating said spider, there being depressions in said track normally receiving said trucks to position said turtle valve in either of its operative positions, a cable and cable drum operatively connected to said spider for rotating the spider and turtle valve as a unit, a counter-balance weight on said cable for assisting in rotating said valve and spider, and a second counter-balance weight on said cable above the first named counter-balance weight for assisting in moving said trucks out of said depressions to permit said valve and spider to clear said pan prior to rotation thereof.

9. A reversing valve for regenerative furnaces comprising a base sealing pan adapted to contain a sealing fluid and having a stack port and opposite gas ports, a stationary housing projecting into said pan, a spider disposed in said pan, a turtle valve carried by said spider adapted to selectively connect either of said gas ports with said stack port, a track on the exterior of said housing, a circular angle iron concentric with the vertical axis of said housing and operatively connected to said spider, trucks carried by said angle iron riding on said track, a circular angle iron carried by the first named angle iron and forming a guide, and a cable supported by the guide angle iron and encircling said guide angle iron and having the ends terminally connected to a cable drum, rotation of said drum in either direction being adapted to rotate said valve and said spider as a unit and selectively position said valve to connect either of said gas ports with said stack port.

10. A reversing valve for regenerative furnaces comprising a sealing pan adapted to contain a sealing fluid, and having a stack port and a pair of gas ports, a spider disposed in said pan, a turtle valve carried by said spider, a stationary housing having a gas port and projecting into said pan below the sealing fluid level thereof, said ports rising above the sealing fluid level of said pan, means disposed exteriorly of said housing for suspending said spider and said valve for rotation as a unit to dispose said valve in either of its operative positions to selectively connect either of said gas ports with said stack port, counter-balance means disposed exteriorly of said housing for assisting in lifting said spider and said valve above said pan to permit rotation of the spider and drum as a unit, means for limiting rotary movement of the spider and valve in either direction, and means for rotating said spider and valve.

In testimony whereof I affix my signature.

CARL D. SMITH. [L. S.]